April 19, 1927.

W. H. WOODS

SUPPORTING DEVICE

Filed Nov. 18, 1925

1,625,757

WITNESS: E. R. Ruppert

W. H. Woods
INVENTOR

BY Victor J. Evans
ATTORNEY

Patented Apr. 19, 1927.

1,625,757

UNITED STATES PATENT OFFICE.

WILLIAM HAGOOD WOODS, OF GABLE, SOUTH CAROLINA.

SUPPORTING DEVICE.

Application filed November 18, 1925. Serial No. 69,919.

The principal object of this invention is to provide means for attaching a boll weevil trap to a cultivator so that the trap can be used at the same time plants are being cultivated.

Another object of the invention is to so arrange the parts that the trap can be easily and quickly placed on the cultivator or removed therefrom.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
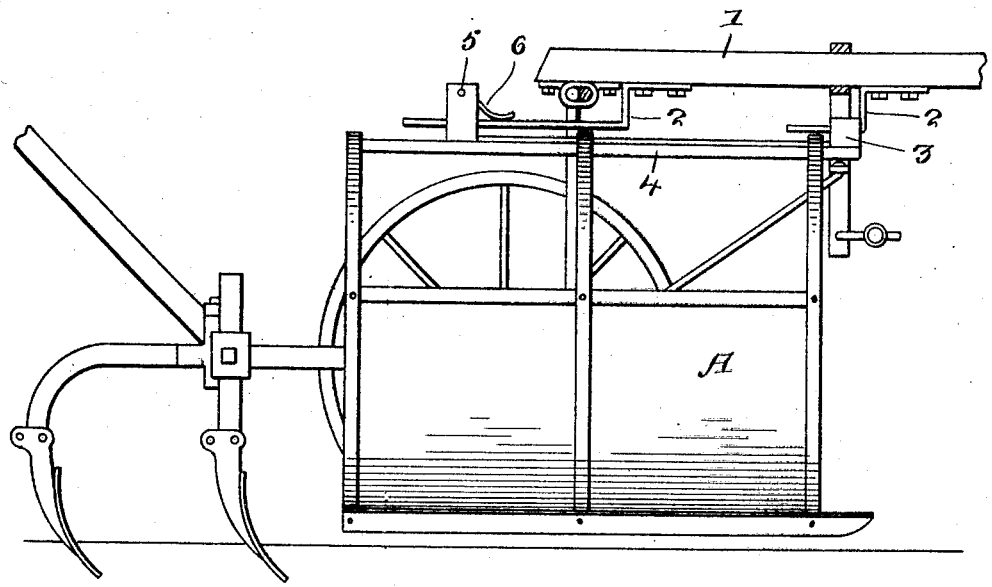
Figure 1 is an elevation showing a trap attached to a cultivator.
Figure 2:
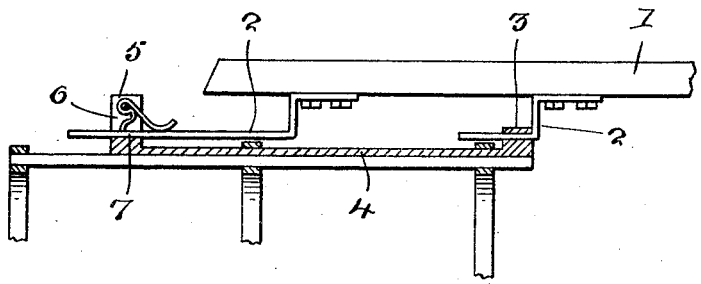
Figure 2 is a longitudinal sectional view through part of Figure 1, parts being shown in elevation.

The boll weevil trap, shown generally at A in the drawings, is now on the market and is known as the "red bird trap". It will, of course, be understood that other traps can be used, if desired.

In carrying out my invention, I attach to the tongue 1 of the cultivator a pair of Z-shaped brackets 2, these brackets being arranged with their lower parts spaced from and parallel with the tongue, with one bracket in front of the other. A socket member 3 is attached to a bar 4 which is connected to the top piece of the trap and is adapted to receive the bottom piece of the front bracket and a U-shaped member 5 is attached to the rear part of the bar 4 and is adapted to receive the rear bracket. A latch member 6 is pivoted between the limbs of the member 5 and has a cam head 7 for clamping a part of the bracket 2 between itself and the bight of the member 5 when the latch member is in operative position. This member will lock the trap to the brackets 2, so that the trap is firmly attached to the cultivator. As will be seen, the trap is placed directly under the tongue in the longitudinal center of the cultivator, so that when the cultivator is being used, it will cultivate crops. The trap will pass over the rows of plants and thus remove the insects therefrom, so that the plants are cultivated and freed of insects at the one operation.

When the trap is to be detached from the cultivator, it is simply necessary to swing upwardly the latch member 6 and then move the trap rearwardly to free it from the brackets.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A supporting device comprising a pair of Z-shaped brackets adapted to be fastened to a support, a member adapted to be fastened to an object to be supported, said member having a socket at one end and a U-shaped member at the other end, said socket and U-shaped member being adapted to receive the brackets and a cam lever in the U-shaped member for clamping a bracket in said member.

In testimony whereof I affix my signature.

WILLIAM HAGOOD WOODS.